M. H. DAMERELL.
PORTABLE SHAPER.
APPLICATION FILED JUNE 29, 1917.

1,275,404.

Patented Aug. 13, 1918.
4 SHEETS—SHEET 1.

Fig. 1.

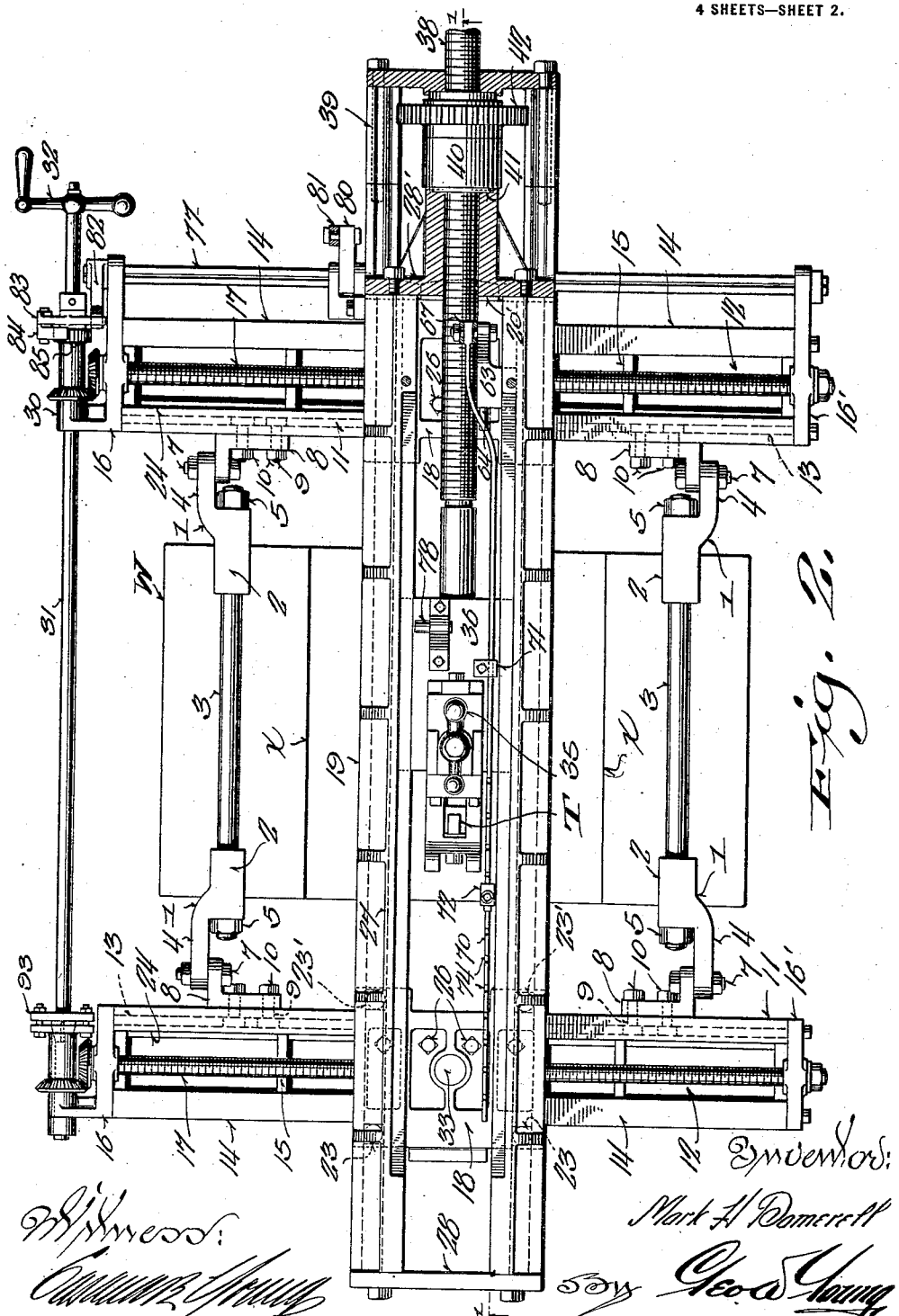

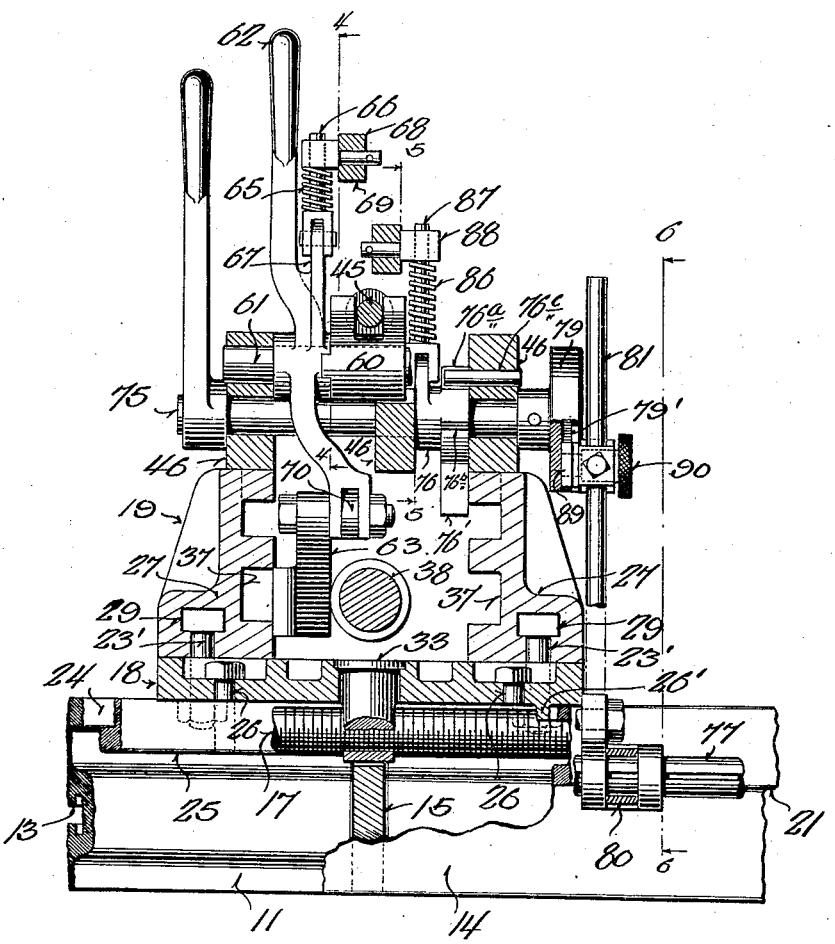

M. H. DAMERELL.
PORTABLE SHAPER.
APPLICATION FILED JUNE 29, 1917.
1,275,404.
Patented Aug. 13, 1918.
4 SHEETS—SHEET 4.
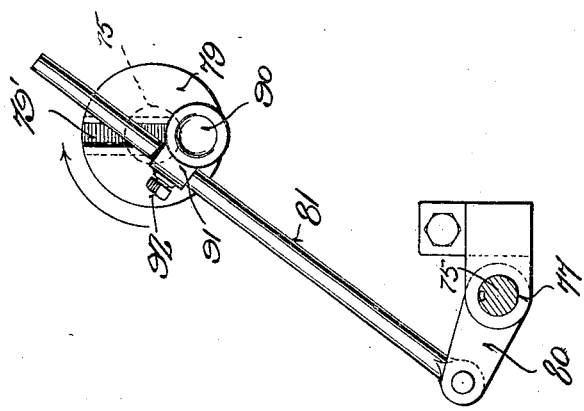
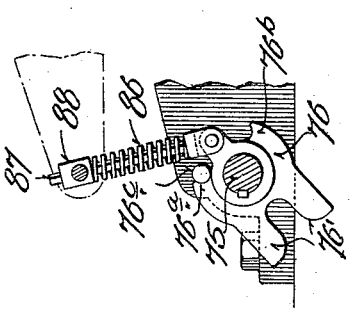
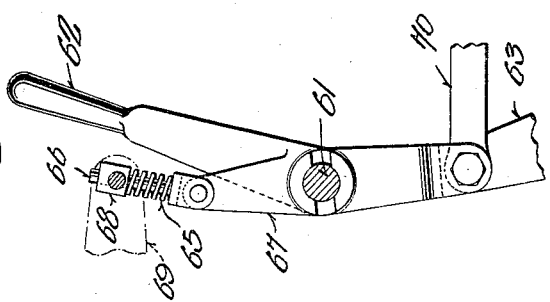
Inventor:
Mark H. Damerell
By Geo. W. Young
Attorney

UNITED STATES PATENT OFFICE.

MARK H. DAMERELL, OF DETROIT, MICHIGAN.

PORTABLE SHAPER.

1,275,404.　　　　　Specification of Letters Patent.　　Patented Aug. 13, 1918.

Application filed June 29, 1917.　Serial No. 177,674.

*To all whom it may concern:*

Be it known that I, MARK H. DAMERELL, a citizen of the United States, and resident of Detroit, in the county of Wayne and State of Michigan, have invented certain new and useful Improvements in Portable Shapers; and I do hereby declare that the following is a full, clear, and exact description thereof.

My invention relates to new and useful improvements in metal working machines or more particularly to that class of machines known to the trade as shapers. In machines at present in use which belong to this general class, it is customary to move the work material to the machine and dispose it in proper position thereon to be actuated on by the cutter. When such work material is large and cumbersome and very heavy it is extremely difficult to properly dispose of same on the bed of an ordinary shaper. Furthermore, it is necessary when operating upon large blocks of metal or similar work material, that the shapers be of large size to accommodate the same.

With this difficulty in view, the present invention has been designed, and therefore it is primarily an object to produce a machine of a portable nature which can be readily moved to the work material rather than moving said material to it.

In carrying out this general object, the secondary objects of the invention are to provide an efficient clamping arrangement whereby the operating parts of the machine may be secured to the work material; to provide an automatic means for reciprocating the cutter head and its cutter; to simultaneously feed the cutter laterally of the work material as said cutter is traveling on its back stroke or at the completion of its cutting stroke; and to provide a simple combination of parts which can be readily assembled and easily and quickly adjusted upon the work material of any shape or size.

With these and other objects and advantages in view the invention resides in the novel features of construction, combination and arrangement of parts which will be hereinafter more particularly described, claimed and shown in the drawings, wherein:

Figure 1 represents a vertical, longitudinal, sectional view through a portable shaper constructed in accordance with my invention and mounted in operative position upon a block of work material, said section being taken substantially upon the plane of the line 1—1 of Fig. 2.

Fig. 2 is a horizontal view taken approximately on the plane of the line 2—2 of Fig. 1 and showing substantially the same parts as appear therein.

Fig. 3 is a vertical transverse sectional view on the plane of the line 3—3 of Fig. 1, and Figs. 4, 5, and 6 are detail sections taken respectively upon the lines 4—4, 5—5, and 6—6 of Fig. 3.

In the accompanying drawings wherein similar reference characters designate like parts throughout the several views, it will be noted that in the main views the improved portable shaper is mounted upon a block W of work material in the center of which is being cut a recess or groove. The machine illustrative consists of several principal parts which include the means for securing the complete shaper to the work material, the means for carrying and driving the reciprocating cutter, the means for supporting the cutter carrying and operating mechanism, and the arrangement whereby the cutter is automatically reciprocated and fed laterally of the work material.

Considering these parts of the machine in detail it will be noted, particularly from Figs. 1 and 2, that the means for clamping the machine to the work material consists of two pairs of clamp dogs 1, each of which includes a sleeve 2 to slidably receive the end portions of a clamping rod 3, and attaching ears 4. The free ends of the rods 3 are screw threaded and receive nuts 5, which when rotated in the proper direction, bind against the outer ends of the sleeves 2 and tend to force the same toward each other. Thus each of the rods 3 carries a pair of the clamp dogs to engage the work material W at each end. Each of the dogs may also be provided with spurs or teeth 6 for biting or frictional engagement with the sides of the work material as shown in Fig. 1.

The ears 4 of the clamp dogs are each secured by bolts and nuts 7 to one arm of L-shaped brackets 8, the other arm of said brackets also being apertured to receive attaching bolts 9 upon the inner end of which are threaded nuts 10. The last mentioned arms of brackets 8 are adapted for sliding engagement with the inner beams 11 of main supports 12, and the square heads of the bolts 9 are disposed in T-shaped slots or key-ways 13 cut in said beams longitudinally thereof. By this construction the clamp dogs and the rods which unite the adjacent pairs may be moved toward or away from each other to accommodate blocks of work material of different lengths, their outward movement being limited only by the length of the beams 11.

The main supports 12, which are always disposed parallel to each other, are composed in addition to the inner beams 11 of outer beams 14 of somewhat similar cross sectional shape; each pair of beams of each support are connected together and held in spaced parallel relation by means of webs 15. The beams 11 and 14 and the webs 15 are preferably cast integrally.

Removably secured to the outer ends of each of the main supports is a plate, the plates at one end of the supports being designated by the numeral 16, while those at the other end bear the numeral 16'. The plates of each support are provided with alined openings which form bearings for the outer ends of feed screws 17, the manner of operation of which will be hereinafter more particularly described.

Mounted for sliding movement on the top of each of the supports 12 is a slide in the form of a plate 18 which is adapted to support a bridge 19, the latter carrying the cutter and the operating means therefor. One side of each slide 18 has a depending portion 20 for engagement with the outer side of the adjacent beam 14, said beams being slightly offset as at 21 to form shoulders. The depending portions 20 have plates 22 secured to their bottom sides by means of bolts 23, and these plates 22 extend beneath the shoulders or offset portions 21 to prevent the raising of the slides out of engagement with the supports 12 as shown in Fig. 1. The other beams 11 are also provided with longitudinally extending shoulders 24 with which L-shaped clamping plates 25 secured to the slides 18 by bolts 26 engage. In addition the slides 18 carry ribs 26' for sliding engagement with inner edges of the beams 14 whereby to coöperate with the plates 20 and 25 to prevent the removal of said slides. It will be noted that by tightening the nuts of the bolts 23 and the bolts 26 that the slides may be locked in any position throughout the length of the supports 12.

The bridge which is supported upon the slides 18 consists of a pair of spaced parallel beams 27, which are roughly L-shaped in cross section, and a tie plate 28 secured to each end of the beams and holding the same together. The bottom of each beam 27 is provided with a longitudinally extending T-shaped slot or key-way 29 in which the square heads of the bolts 23 and similar heads of the bolts 23' are disposed. Such construction permits the bridge to be shifted longitudinally or transversely of the supports 12. However, as soon as the nuts of the bolts 23 and 23' are tightened the bridge will be locked to the slides and the latter in turn fixed to the supports as previously mentioned. Thus the bridge may be moved to any position with respect to the work material regardless of the position which the clamp dogs 1 occupy thereon.

Under ordinary circumstances, however, the slides are not locked to the support 12 in as much as they and the bridge 19 are adapted to be shifted by means of the feed screws 17 hereinbefore mentioned. The plates 16 carry bearings 30 in which is journaled a feed shaft 31, the same being geared in any suitable manner to both of the feed screws 17. Upon the rotation of a crank 32 on one end of the feed shaft the feed screws will be rotated and the bridge 19 will be shifted longitudinally of said screws inasmuch as said screws are threadedly engaged with stationary nuts 33 carried by and depended from the slides 18. Means for mechanically rotating the feed shaft 31 for accomplishing the shifting of the bridge will be hereinafter described.

As previously indicated the bridge 19 is adapted to have a cutter head 34 mounted to slide longitudinally thereof, said cutter head carrying the cutter or tool T of conventional design which is fed to or from the work by rotation of the crank 35 as is customary in machines of this general class. The cutter head includes oppositely disposed ribs 36 which are slidably positioned in longitudinal channels 37 cut in the inner walls of the beams 27 which comprise the sides of the bridge. Connected with the cutter head for causing reciprocation thereof is a main screw 38 which is also disposed between the beams of the bridge and supported in one of the tie plates 28' thereof. Carried thereby is a U-shaped bracket support 39 through the base of which the screw 38 extends. Between the arms of this bracket support 39 and surrounding the screw 38 is disposed a revolving nut 40, said nut having thrust bearings 41 at each end as shown in Fig. 1.

Keyed to this revolving nut 40 is a spur gear 42 which is continuously in mesh with a second spur gear 43. The latter gear is carried by the non-shiftable portion 44 of a clutch shaft, the shiftable portion of which is designated by the numeral 45. This shaft is journaled in bearings on the front and rear gear brackets 46 and 47 respectively which are disposed upon the support 39 and held together at their upper ends by a tie plate 48. Also disposed on the support 39 is a motor bracket 49 on which a motor (not shown) is designed to be mounted. The shaft of said motor is connected with a main drive shaft 50 one end of which is journaled in the bearing formed in the rear gear bracket. A gear 51 on said main drive shaft is in mesh with a gear 52 frictionally held on a shaft 53 also journaled in a bearing of the rear gear bracket 47. The end of the shaft 53 remote from that to which the gear 52 is secured has a pinion 54 connected thereto for meshing engagement with teeth carried by one cup 55 of a two part clutch which is loose upon the portion 44 of the clutch shaft. The coöperating member of the clutch consists of a cone 56 which is operable by movement of the part 45 of the clutch shaft to which it is keyed. This cone is also designed to act with a second cup 55′, said cup carrying gear teeth adapted to mesh with the gear 57 keyed upon a shaft supported in the two gear brackets 46 and 47. This shaft also carries a second gear 58 which is meshed with the pinion 54. The cup 55′ is loose upon the clutch shaft and until the cone 56 is moved into engagement with either of said cups rotation of the main drive shaft will not be transmitted to the main screw 38. It is obvious that upon engagement of the cone 56 with the cup 55 the main screw will be rotated in one direction and that when the cone engages the cup 55′ said screw will be rotated in the reverse direction.

Automatic mechanical means is provided for shifting the cone of the clutch from one cup to the other to reverse the direction of movement of the cutter head when the tool T reaches the end of its cutting and back strokes. In carrying out this movement of the cone 56, the shiftable member 45 of the clutch shaft is reduced adjacent its outer end to rest between the furcations of a bifurcated bell crank block 60 which is keyed upon a spindle 61. Also disposed on the spindle and connected with the block 60 is a reverse lever 62, one end of which forms a handle, while the other end is pivoted to a shifter 63 disposed in sliding engagement with one of the beams 27 of the bridge, as shown in Fig. 3. Movement of the shifter will thus rock the lever 62 and in turn actuate the bell crank block 60 to move the shiftable portion 45 of the clutch shaft outwardly and engage the cone 56 with the cup 55′.

This rocking of the lever 62 is occasioned either by manual movement of the handle or by the engagement of the cutter head 36 with the bumper 64 of the shifter 63. The parts will be held in this position by means of the tension of a spring 65 (Fig. 4) disposed on a spring rod 66, one end of which is pivoted to an ear 67 carried by the lever 62. The spring is positioned between the ear 67 and a guide block 68 carried by an arm 69 formed on the front gear bracket 46, and since the guide block is relatively stationary the spring will exert its tension to hold the ear 67 either to one side or the other of the vertical plane passing through the center of the spindle 61.

To reverse the direction of movement of the cutter head additional means is provided, the same including a bar 70 which is pivoted to the lower end of the lever 62 at the point of its pivotal connection with shifter 63, and coöperative stops carried by the bar and cutter head respectively. The stop on the cutter head is in the form of a guide loop 71 to slidably receive the bar 70, and the stop carried by a bar is adjustable longitudinally thereof, it being in the form of a rectangular clip 72 provided with a lug 73 for engagement in any one of the plurality of notches 74 cut in the bar. By this structure it will be seen that as the cutter head moves outwardly on its back stroke the stop 71 will be brought into engagement with the stop 72 whereby to shift the bar and rock the reverse lever 62 upon its spindle. This will of course throw the cone of the clutch into engagement with the cup 55 and start the cutter head to move on its cutting stroke.

Means for moving the bridge and the mechanism carried thereby to permit the tool T to act upon uncut surfaces of the work material upon each cutting stroke, is directly engaged by the movement of the cutter head 34. The shifting of the bridge is preferably carried out immediately after the termination of the cutting stroke and is, of course, accomplished by rotation of feed screws 17. The parts which will perform this function consists of a shaft 75 mounted in a portion of the front gear bracket 46, a feed rocker 76, a connection between the shaft 75 and a rock shaft 77, and means carried by the cutter head for engagement with the feed rocker. The latter member has one end bifurcated to form a fork 76′ which is designed to receive a pin 78 carried by the cutter head 36. As the cutter head moves toward the feed rocker the pin 78 will be brought into engagement with the fork 76′ to rock the same together with the shaft 75 upon which it is keyed. This rocking of the shaft 75 causes a disk 79 to rotate, which movement is transmitted to the rock shaft 77 by a lever 80 projecting therefrom and a rod 81 pivoted to the lever and connected with the disk 79.

This rock shaft 77 is journally carried by one of the supports 12 and is disposed parallel to the feed screw 17 carried thereby, and one end has an arm 82 for engagement with a bell crank 83 loosely mounted on the feed shaft 31. The bell crank has a pawl 84 pivoted thereto for engagement with ratchet teeth of a ratchet 85 fixed to said feed shaft 31. Upon each movement of the bell crank 83 the feed shaft will be rotated slightly and this movement will be transmitted to both of the feed screws 17 by the geared connection therebetween. The pin 78 remains within the fork 76' until the cutter head moves rearwardly on its back stroke, whereupon the feed rocker 76 is again moved to rock the shaft 75. This movement returns the feed rocker to the position shown in Figs. 1 and 5. From the latter figure it will also be noted that movement of the feed rocker is limited in both directions by the engagement of ears 76$^a$ and 76$^b$ with a pin 76$^c$, the latter being fixed to the portion of the front gear bracket 46 in which the shaft 75 is mounted. The return of the feed rocker to its normal position, as in Fig. 5, places the pawl 84 so that it may again actuate the feed shaft 31 when the rock shaft 75 is next rotated.

The feed rocker is caused to remain in either of these two positions, that is to say, the pin 76$^c$ will be engaged with either of the ears 76$^a$ or 76$^b$, by means of a spring 86 and spring rod 87 which is pivoted to said feed rocker. The spring acts in the same manner as the spring 65 and is confined between the pivoted end of the spring rod and a guide block 88.

The connection between the disk 79 and rod 81 is readily adjusted in view of the fact that said disk is provided with a T-shaped slot or key-way 79' in which is disposed a nut 89. A bolt 90 has one end reduced and threaded for engagement with the nut and the shoulder formed by the reduced portion is adapted to be engaged with the outer face of the disk to hold the nut in any position within the slot 79'. The bolt 90 also carries a sleeve 91 in which the rod 81 may be adjustably held by a set screw 92.

Although the operation of this portable shaper can probably be ascertained from the foregoing detail description, it may be briefly set forth as follows:

The machine is carried to the work material W and disposed thereon with the bridge 19 positioned approximately over the point where the cut is to be made. The clamp dogs are then adjusted upon the work and secured thereto in the manner hereinbefore set forth with the supports 12 disposed in parallel relation on opposite sides of the work material W. The next operation is to adjust the length of the feed shaft 31 by means of the separable connection 93 between the two parts thereof so that the feed screws 17 will be simultaneously actuated. The bridge is then moved longitudinally of the supports 12 by rotation of the crank 32 until the cutter or tool T is directly over the point where the cut is to begin. On the piece of work material shown in Fig. 2 the tool would be disposed so that it could move along either of the lines $x$ depending upon the direction in which the bridge is to feed.

Before starting the operation of the motor which is connected with the main drive shaft 50 the bridge is shifted longitudinally upon the slides 18 until the shifter 63 is in such position that when it is engaged by the front end of the cutter head the tool T will have entirely completed its forward or cutting stroke. The stop 72 is next adjusted so that it will be engaged by the stop 71 when the tool T has completed its back or return stroke. Now upon starting operation of the main drive shaft 50 and the engagement of the cone 56 of the clutch with its cup 55, the nut will be rapidly revolved to cause the main screw 38 to feed forwardly and carry the cutter head on its cutting stroke, assuming, of course, that the tool T and the cutter head had been at the left hand end of the work material as seen in Figs. 1 and 2.

This movement of the cutter head on its cutting stroke will continue until its forward end engages the bumper of the shifter 63, whereupon the reverse lever 62 will be shifted as previously set forth and the cone 56 of the clutch will be disengaged from the cup 55 and moved into contact with the cup 55'. The cutter head will thereby be returned to its initial position at a rate of speed substantially twice that with which it moves forwardly due to the different combination of gears between the main drive shaft and the gear 42. It might be here mentioned that when the cutter is moving forwardly the gears 42, 43, 51, 52, the pinion 54, and the gear teeth on the cup 55 are in operation, whereas when the cutter head is moving in the reverse direction the gears 57 and 58 and the gear teeth on the cup 55' are brought into play and the cup 55 is rendered inactive.

Continuing with the description of the movement of the cutter head it will be seen that as it nears the end of its cutting stroke, the pin 78 will engage the feed rocker 76 and perform the function of operating the feed screws 17 to shift the bridge and mechanism thereof. On the return stroke of the cutter head the stops 71 and 72 engage to again operate the reverse lever to move the cone of the clutch into engagement with the cup 55. A continuous reciprocative movement is thereby imparted to the cutter head as long as the motor continues to operate or until the cone of the clutch is moved out of engagement with either of the cups forming part of the same.

After the cut in the work material is completed the machine is readily removed therefrom by loosening the clamp dogs. It may be then moved to the next piece of work material and the operations above described repeated.

Various changes in the form, proportion and in the minor details of construction may be resorted to without departing from any

I claim:

1. A shaper or the like including a main support comprising a pair of spaced beams, each of said beams having a longitudinally extending shoulder, a slide in the form of a plate disposed on said beams and straddling the same, one side of said slide having a laterally extending portion adjacent the shoulder of one of the beams, a plate secured to the laterally extending portion to engage the adjacent shoulder, an L-shaped clamping plate secured to the slide and engaged with the shoulder of the other beam, a bridge secured to the slide, and a cutter carried by the bridge.

2. A portable shaper or the like including a pair of normally spaced main supports, said supports being movable toward and away from each other, means for clamping said supports in any of their several adjusted positions, a bridge slidably movable on said supports, a cutter carried by the bridge, means for moving the cutter, and means for automatically shifting the bridge with respect to said supports at predetermined intervals.

3. A portable shaper or the like including a main support comprising a pair of spaced beams connected together, a pair of clamped dogs each having a sleeve, a rod slidably disposed in said sleeves, means on one end of the rod for moving one of the dogs toward the other whereby to clamp said support to work material, a bridge slidably movable on said support, a cutter carried by the bridge, means for shifting the bridge with respect to said support comprising a feed screw rotatably mounted between said spaced beams, a nut carried by the bridge and connected with said feed screw, and means for rotating the feed screw.

4. A portable shaper including a main support, means for clamping the support to work material, a carriage slidable on the support, a cutter slidably mounted on the carriage, means for reciprocating the cutter on said carriage, and means for automatically shifting the carriage on the support during inoperative movement of the cutter.

5. A portable shaper including a main support, a cutter carried by the support, and means for securing the support to work material comprising a pair of clamp dogs each having a sleeve, a rod slidably disposed in said sleeves, and means on one end of the rod for moving one of the dogs toward the other.

6. A portable shaper including a main support, a cutter carried by the support, means for securing the support to work material comprising a pair of clamp dogs each having a sleeve, one of said dogs being slidably connected with the support, a rod slidably disposed in said sleeves, and means on one end of the rod for moving one of the dogs toward the other.

7. A portable shaper including a main support having a longitudinal slot in one wall, a cutter carried by the support, means for securing the support to the work material comprising a bracket, a connection between the bracket and support, said connection being slidably disposed in the slot of the latter, a pair of clamp dogs, one being secured to the bracket, a rod connecting the dogs, and means for moving the dogs toward each other.

8. A portable shaper including a pair of spaced supports, each having a longitudinal groove in its inner face, a bracket for each support, a bolt extending from each bracket and slidably disposed in the slot of the adjacent support, a clamp dog secured to each bracket, each dog including a sleeve, a rod disposed in said sleeves, means on the ends of the rod for drawing the dogs toward each other, and a cutter carried by the support.

9. A shaper or the like comprising a main support, a bridge slidable on the support, said bridge having a longitudinal guide groove, a cutter carrying member mounted on the bridge, means for moving the cutter carrying member in opposite directions, and means for intermittently changing the direction of movement of said cutter carrying member including a lever, and a shifter pivoted to the lever and having a guide portion slidably disposed in said guide groove, said shifter being intermittently engaged by the cutter carrying member.

10. A shaper or the like comprising a main support, a bridge slidable on the support, a cutter carrying member mounted on the bridge, means for shifting the bridge longitudinally of the main support, means for actuating the shifting means including a rock shaft, a second shaft, a lever extending from the rock shaft, a rod pivoted to the lever, an adjustable connection between the rod and the second shaft, and means operable by the cutter carrying member for intermittently moving the second shaft, said movement being transmitted to the rock shaft.

11. A shaper or the like comprising a main support, a bridge slidable on the support, a cutter carrying member mounted on the bridge, means for shifting the bridge longitudinally of the main support, means for actuating the shifting means including a rock shaft, a second shaft, a lever extending from the rock shaft, a rod pivoted to the lever, a disk-like plate secured to the second shaft, said plate having a diametrical slot, a sleeve adjustably mounted in said slide, a rod having one end adjustably disposed in said sleeve, the other end being pivoted to said lever, and means operable by the cutter carrying member for intermittently moving the second shaft, said movement being transmitted to the rock shaft.

12. A shaper or the like comprising a main support, a bridge slidable on the support, a cutter carrying member mounted on the bridge, means for shifting the bridge longitudinally of the main support, means for actuating the shifting means including a rock shaft, a second shaft, an adjustable connection between the two shafts to impart movement of one to the other, and means operable by the cutter carrying member for intermittently moving the second shaft.

13. A shaper or the like comprising a main support, a bridge slidable on the support, a cutter carrying member mounted on the bridge, means for shifting the bridge longitudinally of the main support, means for actuating the shifting means including a pivoted feed rocker normally held in one position, and means on the cutter carrying member for moving the feed rocker out of normal position when said cutter carrying member is shifted in one direction, said means returning the feed rocker to a normal position when the cutter carrying member is shifted in a reverse direction.

14. A shaper or the like comprising a main support, a bridge slidable on the support, a cutter carrying member mounted on the bridge, means for shifting the bridge longitudinally of the main support, means for actuating the shifting means including a pivoted feed rocker having one end forked, said feed rocker being normally held in one direction, and a pin on the cutter carrying member for engaging in the fork of the feed rocker, said pin moving the feed rocker out of normal position when the cutter carrying member is shifted in one direction, said pin returning the feed rocker to normal position when the cutter carrying member is shifted in a reverse direction.

15. A shaper comprising a main support, a bridge slidable on the support, a cutter carrying member slidable on the bridge, means for shifting the bridge longitudinally of the support including a feed shaft, a connection between the feed shaft and the bridge, a rock shaft, means for rocking the rock shaft, a pawl and ratchet arrangement on the feed shaft, a lever for operating the pawl, and an arm extending from the rock shaft to actuate the lever.

16. A shaper or the like comprising a main support, a bridge slidable on the support, a cutter carrying member mounted on the bridge, means for shifting the bridge longitudinally of the main support, means for actuating the shifting means including a rock shaft, a second shaft, a lever extending from the rock shaft, a rod pivoted to the lever, an adjustable connection between the rod and the second shaft, a pivoted feed rocker on the second shaft and normally held in one position, and means on the cutter carrying member for moving the feed rocker out of normal position when said cutter carrying member is shifted in one direction.

17. A shaper of the class described comprising a main support, a bridge slidable on the support, a cutter carrying member mounted on the bridge, means for shifting the bridge longitudinally of the main support, means for actuating the shifting means including a pivoted feed rocker having one end forked, and means carried by the cutter carrying member for engagement with said forked end of the feed rocker for rocking the same during movement of said cutter carrying member.

18. A shaper comprising a main support, a bridge slidable on the support, a cutter carrying member mounted on the bridge, means for shifting the bridge longitudinally of the main support, means for actuating the shifting means including a rock shaft, a second shaft, an adjustable connection between the two shafts to impart movement of one to the other, a feed rocker on the second shaft having one end forked, and means carried by the cutter carrying member for engagement of said forked end of the feed rocker for rocking the same during the movement of the cutter carrying member.

19. A shaper comprising a main support, a bridge slidable on the support, a cutter carrying member mounted on the bridge, means for shifting the bridge longitudinally of the main support, means for actuating the shifting means including a rock shaft, a second shaft, a lever extending from the rock shaft, a rod pivoted to the lever, an adjustable connection between the rod and the second shaft, a feed rocker on the second shaft having one end forked, and means carried by the cutter carrying member for engagement with said forked end of the feed rocker for rocking the same during movement of said cutter carrying member.

In testimony that I claim the foregoing I have hereunto set my hand at Worcester, in the county of Worcester and State of Massachusetts.

MARK H. DAMERELL.

Copies of this patent may be obtained for five cents each, by addressing the "Commissioner of Patents, Washington, D. C."